US007619542B2

(12) United States Patent
Riesco Prieto et al.

(10) Patent No.: US 7,619,542 B2
(45) Date of Patent: Nov. 17, 2009

(54) SYSTEM FOR ESTIMATING THE LOCATION OF VEHICLES IN PARKING LOTS

(75) Inventors: Pablo Riesco Prieto, Madrid (ES); Javier Riesco Prieto, Madrid (ES)

(73) Assignee: Quality Informatoins System, S.A., Pozuelo de Alarcon, Madrid (ES)

( * ) Notice: Subject to any disclaimer, the term of this patent is extended or adjusted under 35 U.S.C. 154(b) by 283 days.

(21) Appl. No.: 11/715,072

(22) Filed: Mar. 6, 2007

(65) Prior Publication Data

US 2007/0205918 A1 Sep. 6, 2007

(30) Foreign Application Priority Data

Mar. 6, 2006 (ES) ................................ 200600540

(51) Int. Cl.
*B60Q 1/48* (2006.01)

(52) U.S. Cl. ..................... 340/932.2; 340/988; 340/933

(58) Field of Classification Search .............. 340/932.2, 340/988, 990, 933, 937, 435, 436; 705/13
See application file for complete search history.

(56) References Cited

U.S. PATENT DOCUMENTS

| | | | | |
|---|---|---|---|---|
| 5,845,268 | A * | 12/1998 | Moore | 340/932.2 |
| 6,340,935 | B1 * | 1/2002 | Hall | 340/932.2 |
| 6,650,250 | B2 * | 11/2003 | Muraki | 340/932.2 |
| 7,026,954 | B2 * | 4/2006 | Slemmer et al. | 340/932.2 |
| 7,135,991 | B2 * | 11/2006 | Slemmer et al. | 340/932.2 |
| 7,466,223 | B2 * | 12/2008 | Sefton | 340/937 |
| 2002/0171562 | A1 * | 11/2002 | Muraki | 340/932.2 |
| 2004/0068433 | A1 * | 4/2004 | Chatterjee et al. | 705/13 |
| 2005/0083212 | A1 * | 4/2005 | Chew | 340/932.2 |
| 2007/0005226 | A1 * | 1/2007 | Sutardja | 701/117 |

FOREIGN PATENT DOCUMENTS

| | | |
|---|---|---|
| JP | 2003-233898 | 8/2003 |
| WO | WO 00/46068 | 8/2000 |
| WO | WO 2005/022485 A1 | 3/2005 |

* cited by examiner

*Primary Examiner*—Eric M Blount
(74) *Attorney, Agent, or Firm*—Merchant & Gould P.C.

(57) ABSTRACT

A system for estimating the location of vehicles in parking lots. The system includes a reading device to capture data related to license plates of the cars circulating through the inside of the parking lot through a plurality of control points, and a detection device to record the availability of the spaces through a plurality of sensors. The system also includes an input device to manually enter the license plate of a car to be located inside the parking lot, a location device to locate the vehicle by a control mechanism, based at least on the previously recorded information by the reading device and detection device, and an output device to generate a report with the spaces in which the vehicle is most likely parked.

3 Claims, 3 Drawing Sheets

SYSTEM FOR ESTIMATING THE LOCATION OF VEHICLES IN PARKING LOTS

FIELD OF THE INVENTION

The invention is comprised within systems for locating vehicles in enclosed areas, intended for locating these vehicles, in certain physical spaces.

BACKGROUND OF THE INVENTION

The existence of systems for reading license plates and systems for detecting occupied spaces are known.

Systems for reading license plates in parking lots have basically been used to control authorized vehicles, wanted vehicles (so-called black-listed vehicles) or to associate a certain license plate with a receipt number, for example.

Systems for controlling occupied spaces have also existed for some time, and they are used to know which areas of the parking lot have free spaces through systems guiding users who are driving a vehicle by means of displays with the number of free spaces, etc.

However, the existence of systems providing a list which includes the possible space numbers where a specific car may be located that was previously parked in a parking lot is unknown.

SUMMARY OF THE INVENTION

It has therefore been considered that a system is needed that allows locating in a specific moment the range of spaces associated to the inside of a parking lot where the specific vehicle is most likely parked.

The invention relates to a system for estimating the location of vehicles in parking lots, having:

reading means, configured to read and record first data A associated with the license plate of a vehicle accessing the inside of a parking lot; and detection means, configured to record, through a plurality of sensors, second data B indicating a change of availability status, selecting from free and occupied, of the parking lot spaces;

in which the reading means, through a plurality of control points, capture at least the following information corresponding to data A: vehicle license plate number, exact date and time of this capture;

in which the detection means, record at least the following information, corresponding to data B: space number, the availability status of the spaces, exact date and time in which a vehicle occupied or left each of the spaces;

in which the system is characterized in that it comprises:

input means, configured to manually enter a license plate number corresponding to a vehicle to be located inside a parking lot;

location means, configured to locate the vehicle inside the parking lot;

output means, configured to generate a report;

the reading means, detection means and location means being operatively related (b, c) such that by making use of the previously recorded information through:

the input means (which have previously collected the license plate number to be located), a first receiver, configured to receive data A (this device is responsible for receiving data which have previously been read by the reading means, i.e. it receives the information captured by the control points, distributed throughout the parking lot, relating to the license plates of the cars circulating through the different roads of the parking lot), and a second receiver, configured to receive data B, (this device is responsible for receiving data which have previously been recorded by the detection means, i.e. it receives the information relating to the change of status corresponding to a space resulting from a vehicle parking in said space or leaving it);

the location means can determine, by means of a control mechanism, a list of possible spaces in which the vehicle may be located inside the parking lot.

The system can be configured so that the control points, responsible for at least reading the license plates of the cars, are at least located at the parking lot entrances, although they may also be at the exits and/or on the access ramps and the ramps for accessing other floors, and/or in the passage ways and/or in inner lanes of the parking lot communicating different areas of the parking lot in the same floor.

The system can be configured to continuously receive on one hand the information provided by the detection means relating to the numbers of parking lot spaces that are occupied or free and the time in which each of them is occupied or free; and on the other hand, the information provided by the reading means relating to the license plate readings taken at the different parking lot control points and the date and time in which said readings are taken.

The control mechanism will be configured so that it can evaluate which spaces have gone from being free to being occupied after the last reading point of the license plate of that vehicle, limiting the group of possible spaces to those that can be accessed from that control point. Therefore, the control mechanism can be configured to establish, by means of a probability calculation, an arrangement, from the lowest to the highest, of the list of possible spaces (in which it is possible that the car to be located may be parked), taking into account:

the information contained in the mentioned data A, and data B, and, the modulus of the difference between the estimated theoretical time of the routes existing between the last reading point and each space, and the time in which each of the spaces is actually occupied after this last reading taken by the control point.

The estimated pre-established times of the routes existing between each control point and each space can either be assigned manually for each of them or a digitalized map containing the location of the spaces, the control points, the areas, ramps, passage ways, etc. can be entered in the system and the system itself will calculate the estimated times. The estimated times of the routes can in turn vary according to the level of traffic and occupation of the parking lot.

The output means can be configured to send the report containing the list with the numbers of space in which it is possible that the vehicle is parked at least to a device selected from a mobile telephone, through an SMS (Short Message Service; hereinafter SMS), a PDA (Personal Digital Assistant; hereinafter PDA), a computer screen, a printer, and combinations thereof.

If the parking lot is divided into different zones or areas, the system may also provide in which area the vehicle may be parked and in which it is not.

The system can be configured such that the precision of the system may be conditioned essentially by the size of the parking lot, the physical arrangement of the roads inside said parking lot, and the number of license plate control points.

BRIEF DESCRIPTION OF THE DRAWINGS

A series of drawings which aid to better understand the invention and which are expressly related with an embodiment of said invention are briefly described below, presented as an illustrative and non-limiting example thereof.

DETAILED DESCRIPTION OF THE PREFERRED EMBODIMENT(S)

The present invention relates to a system which allows knowing at a certain time in which spaces of a parking a vehicle is most likely parked, and in which spaces it is impossible for the vehicle to be parked. Before this point, obviously the vehicle has accessed the inside of the parking lot and has found a free space to park, which space is identified at least with a space number.

Figure 1:
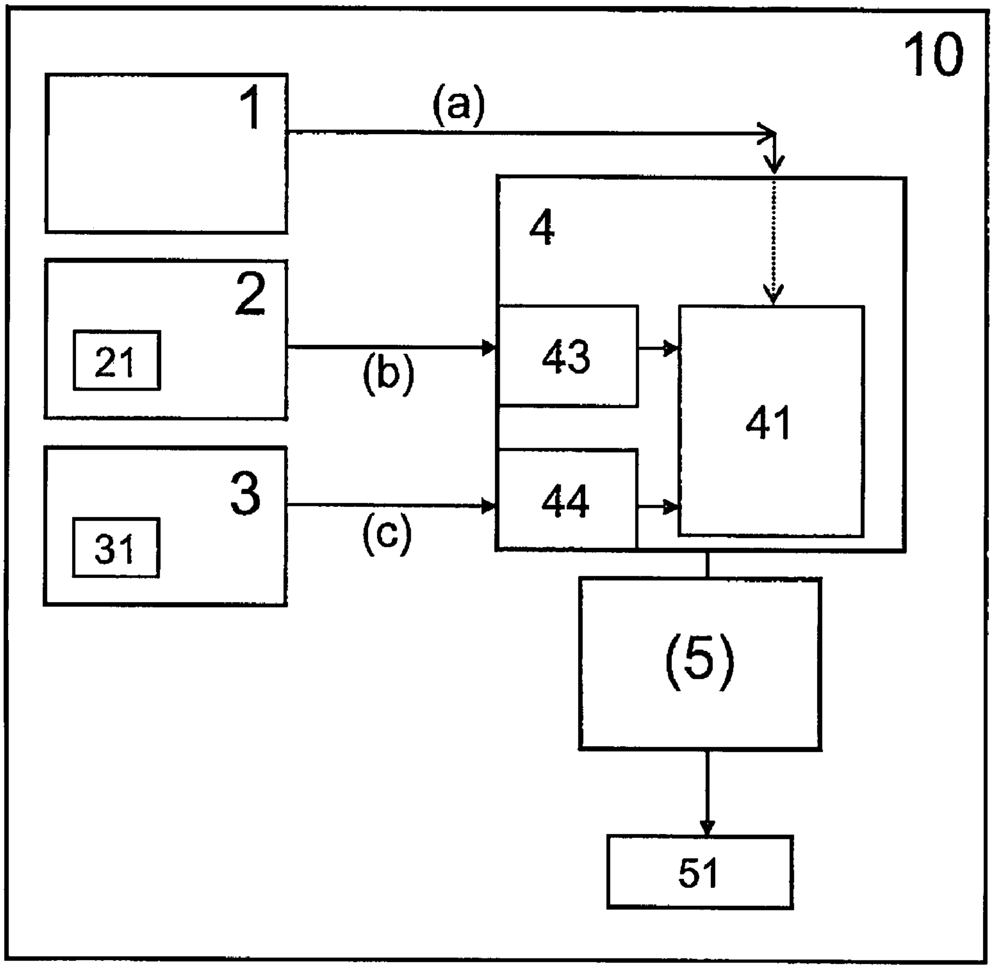
FIG. 1 is a block diagram of the system, showing a series of functional modules of a preferred embodiment of the invention.
Figure 2:
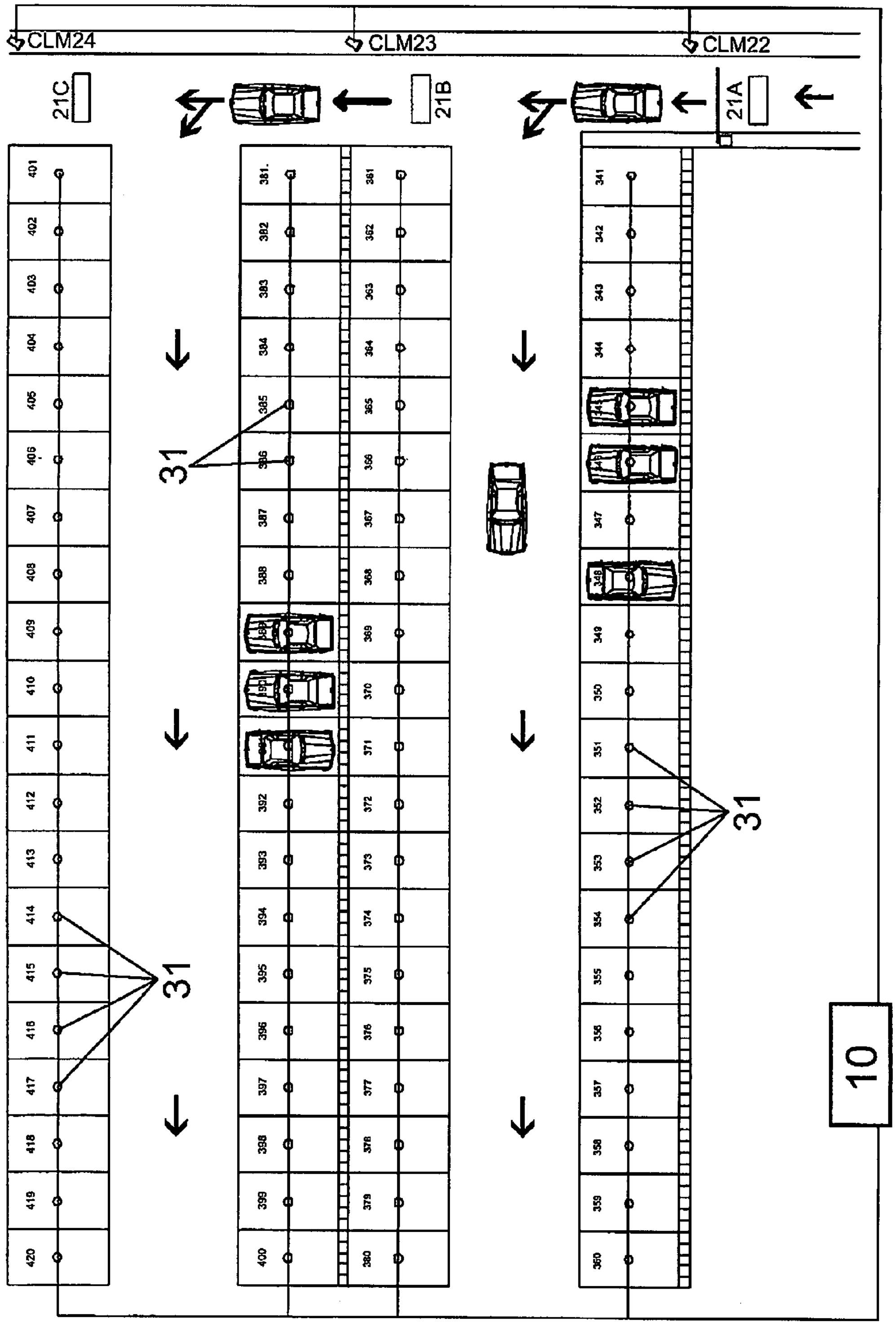
FIG. 2 is a detailed view of the invention.

As is shown in FIGS. 1 and 2, the system (10) for estimating the location of vehicles, hereinafter the system, having:

reading means (2) configured to read data A corresponding to the license plate of a car that has accessed the inside a parking lot through a plurality of control points (21) which will be located at least at the parking lot entrance;

detection means (3) configured to record data B indicating a change of availability status, selecting from free or occupied, of the spaces of the parking lot;

in which the reading means (2), through a plurality of control points (21), capture at least the following information corresponding to data A: vehicle license plate number, exact date and time of this capture;

in which the detection means (3) record at least the following information corresponding to data B: space number, the availability status of the spaces, exact date and time in which a vehicle has parked in a space;

is characterized in that it comprises:

input means (1) configured to manually enter a license plate number corresponding to a vehicle to be located inside a parking lot, location means (4) configured to locate the vehicle inside the parking lot, output means (5) configured to generate a report (51);

the reading means (2), detection means (3) and location means (4) being operatively related (b, c), such that, by making use of the previously recorded information through:

the input means (1), a first receiver (43), configured to receive data A (this device is responsible for receiving the information captured by the control points, distributed throughout the parking lot, relating to the license plates of the cars circulating through the different roads of the parking lot), and a second receiver (44) configured to receive data B (this device is responsible for receiving data which have previously been recorded by the detection means, i.e. they receive information relating to the change of status corresponding to a space when a vehicle either parks in said space or leaves it), the location means (4) can determine, by means of a control mechanism (41), a list of possible spaces in which the vehicle may be located inside the parking lot.

In this preferred embodiment according to FIG. 2, in the parking lot there are three control points, identified as CLM22 (21A), CLM23 (21B) and CLM24 (21C); assuming that the license plate number of the vehicle which has parked in space number 390 is as follows: 1234BCD.

The system (10) receives the indicating data A from the reading means (2) through the receiver (43) A, together with the indicating data B from the detection means (3) through the receiver (44) B, to be used by this system (10) when the vehicle with license plate 1234BCD, which has been parked beforehand, is to be located.

Figure 3:
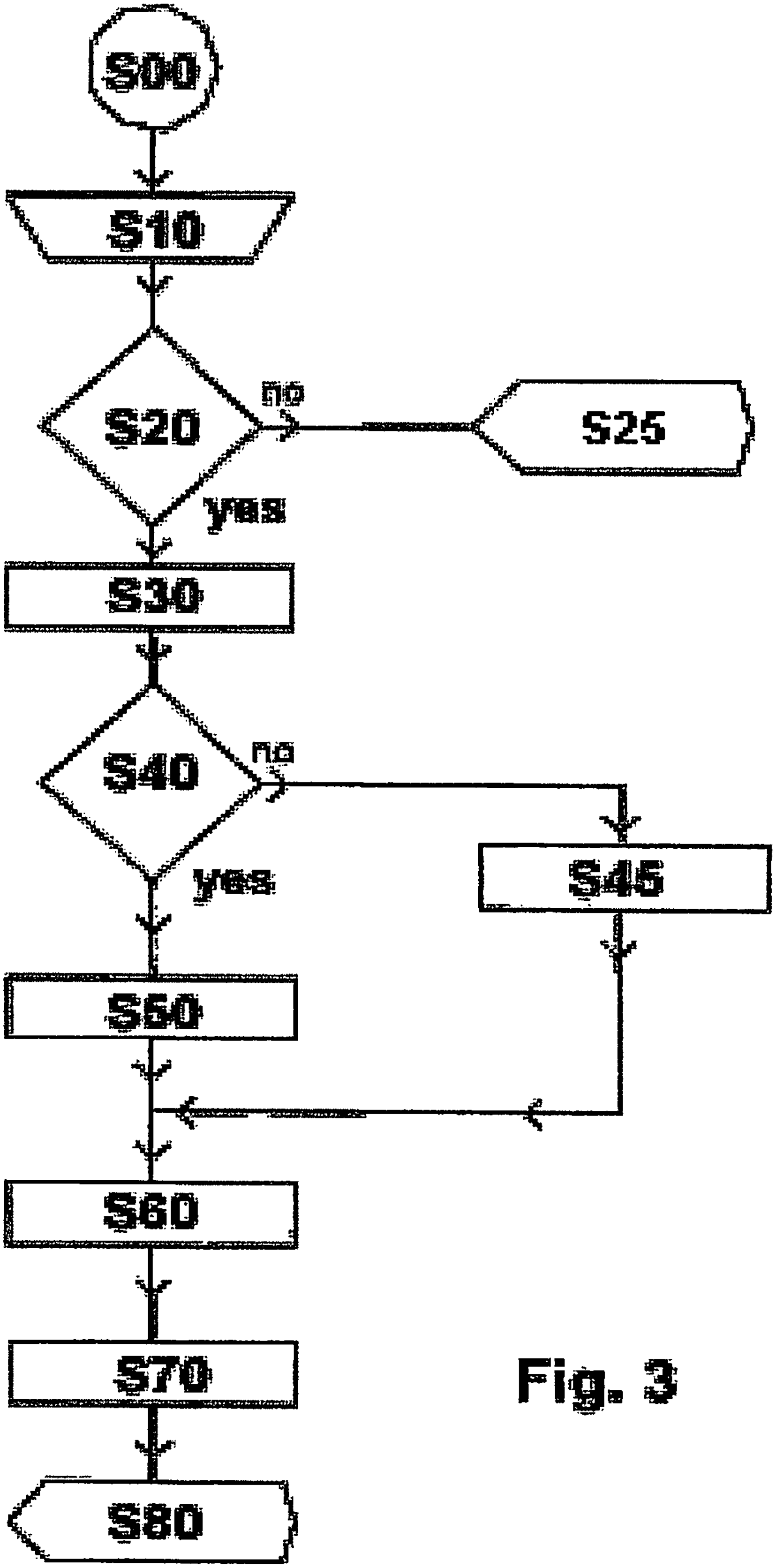
FIG. 3 is a flowchart of the steps of the system.

FIG. 3 shows the sequence of steps describing the system (10) when the vehicle with license plate 1234BCD is to be located, the system being started in step P00.

The system (10) is configured so that the license plate, in this case license plate 1234BCD, of the vehicle to be located, is manually entered through the input means (1), through step P10.

In step P20, the system verifies whether or not the license plate to be located is stored in a reading file compiling all the license plate readings corresponding to the vehicles that are parked inside the parking lot. Two situations may occur; in the first situation, according to step P25, the license plate 1234BCD is not in the reading file that the system (10) contains, the latter being configured to display a message corresponding to the non-location of the vehicle attempted to be located; the second situation occurs when license plate 1234BCD is contained in the reading file of the system (10), and then the system continues to step P30 to assign the license plate a date A0, a time A0 and the control point CLM22 (21 A), the latter corresponding to the control point which is at least located at the parking lot entrance.

After that, the system (10) is configured so that the vehicle with license plate 1234BCD can be located through a control mechanism (41) comprised in the location means (4) of the system (10).

To that end, in step P40 the system (10) asks if license plate 1234BCD to be located has been read by the subsequent control points (21B or 21C) which are located inside the parking lot, excluding the point at the entrance (21A). Two situations may occur:

the first situation occurs according to step P45, when the license plate has not been read by the inner points (21B or 21C), after which the system assigns, on one hand, date A0 to date A1, time A0 to time A1, in which it is considered that date A1 and time A1 correspond to data associated to the last reading of the vehicle to be located, and on the other hand assigns point (21) as last control point, i.e. in this step P45, when the wanted license plate is read only in the control point at the parking lot entrance, the data collected by the system (10) by means of the corresponding control point (21A) located at the parking lot entrance, are considered as the data of the last reading of the license plate of the vehicle to be located inside the parking lot;

the second of the two situations corresponds with step P50, occurring when the license plate of the vehicle to be located (in this preferred embodiment license plate 1234BCD) has been read by control points (21B, 21C) located inside the parking lot and which does not correspond with control point (21A) at the entrance. The data corresponding to this last reading of the license plate are considered as date A1, time A1.

While the system (10) has identified the date A1, time A1 and the corresponding control point (21A, 21B or 21C, in this preferred embodiment) through step P45 or step P50, the system (10) continues to step P60.

After that and through the mentioned step P60, the control mechanism (41) is configured so that it can look for and identify the spaces that can be accessed from the last control point which read the wanted license plate (according to the embodiment of FIG. 2, those comprised between number 381 and number 420), and which have changed in status, going from being free to being occupied, from date A1 and time A1 corresponding to the last reading of the license plate of the vehicle to be located taken by the control point (in this case, camera CLM23 corresponding to control point 21B, took the last reading of license plate 1234BCD in date A1 and time A1), up to a time interval after time A1, which can be identified as date A2, time A2.

Furthermore, through step P70 the control mechanism (41) is also configured to arrange from the lowest to the highest, by the order of probability, the spaces having a status that has gone from being free to being occupied after date A1 and time A1; this order is marked at least according to the modulus of the difference between the time elapsed between date A1, time A1 and the date and time each of the spaces is occupied, and the estimated theoretical time for each of the routes existing between the last reading control point (21) in which the wanted license plate was read and each space.

After that, the system (10) is configured to generate a report (51) in step P80, through the output means (5), which report may contain the possible spaces which the vehicle is most likely parked in. These output means (5) will likewise be configured to send the report (51) to a device, this device possibly being a mobile telephone, a PDA, a computer screen, a printer and combinations thereof.

Other variants of the invention relate to the particular case in which the parking lot is divided into zones or areas, the system (10) may provide which areas the vehicle may be parked in and which it is not.

The system (10) is considered to be particularly useful in cases in which there is a car bomb threat inside a parking lot and the license plate of said car has been provided.

The invention claimed is:

1. A system for estimating the location of vehicles in parking lots, having:

reading means configured to read and record first data A associated with the license plate of a vehicle accessing the inside a parking lot; and detection means configured to record, through a plurality of sensors, second data B indicating a change of availability status, selecting from free and occupied, of the parking lot spaces;

in which the reading means, through a plurality of control points, capture at least the following information corresponding to data A: location of the control point, license plate number of the vehicle, exact date and time of this capture;

in which the detection means record at least the following information, corresponding to data B: space number, the availability status of the spaces, exact date and time in which a vehicle has parked in the space;

in which the system comprises:

input means configured to manually enter a license plate number corresponding to a vehicle to be located inside a parking lot, location means configured to locate the vehicle inside the parking lot, output means configured to generate a report;

the reading means, detection means and location means being operatively related such that by making use of the previously recorded information through: the input means, a first receiver configured to receive data A, and a second receiver configured to receive data B;

the location means can determine, by means of a control mechanism, a list of possible spaces in which the vehicle may be located inside the parking lot, wherein the control mechanism is configured to establish the list of possible spaces by means of a probability calculation.

2. A system according to claim 1, wherein the control mechanism is configured to calculate the list taking into account:

the information contained in the data A, and the data B, an estimated theoretical time associated to each route comprised between the control point which took a last reading of the license plate and each of the spaces of the parking lot which have been occupied in a time interval after the moment in which this last reading of the license plate has been taken; and, the modulus of the difference between the estimated theoretical time established for each route existing between that last reading point and each space, and the time in which each of the spaces is actually occupied after this last reading taken by the control point.

3. A system according to claim 1, wherein the output means are configured to send the report at least to a device selected from a mobile telephone, by means of an SMS, a PDA, a computer screen, a printer, and combinations thereof.

* * * * *